(12) United States Patent
Yang et al.

(10) Patent No.: US 12,354,207 B2
(45) Date of Patent: Jul. 8, 2025

(54) METHOD AND SYSTEM FOR PROCESSING GRAPHICS IN TILE-BASED RENDERING MODE

(71) Applicant: INNOSILICON MICROELECTRONICS (ZHUHAI) CO., LTD., Zhuhai (CN)

(72) Inventors: Xile Yang, Zhuhai (CN); Hai Ao, Zhuhai (CN)

( * ) Notice: Subject to any disclaimer, the term of this patent is extended or adjusted under 35 U.S.C. 154(b) by 293 days.

(21) Appl. No.: 18/188,407

(22) Filed: Mar. 22, 2023

(65) Prior Publication Data

US 2024/0127524 A1 Apr. 18, 2024

Related U.S. Application Data

(63) Continuation of application No. PCT/CN2022/137261, filed on Dec. 7, 2022.

(30) Foreign Application Priority Data

Oct. 13, 2022 (CN) .......................... 202211250530.2

(51) Int. Cl.
*G06T 15/00* (2011.01)
*G06T 7/13* (2017.01)
*G06T 7/90* (2017.01)

(52) U.S. Cl.
CPC .............. *G06T 15/005* (2013.01); *G06T 7/13* (2017.01); *G06T 7/90* (2017.01); *G06T 2207/10024* (2013.01)

(58) Field of Classification Search
None
See application file for complete search history.

(56) References Cited

U.S. PATENT DOCUMENTS 10,242,481 B2 * 3/2019 Gruber ................. G06T 15/005
2018/0197270 A1 * 7/2018 Howson ................. H04N 19/00

FOREIGN PATENT DOCUMENTS

CN 115147579 A 10/2022

* cited by examiner

*Primary Examiner* — Yanna Wu

(57) ABSTRACT

A method and system for processing graphics in tile-based rendering mode are disclosed. The system includes: a geometry processing system configured to perform geometry processing on primitives to tile visible primitives into a plurality of tiles M in screen view space; and a fragment processing system configured to render the plurality of tiles M to generate rendered images of the plurality of tiles M. The fragment processing system includes a post-processing module configured to start to perform pixel filtering on pixels in a first pixel set Pin0 of a target tile M0 in the plurality of tiles M at a first time after a rendered image of the target tile M0 is generated and before all the rendered images of the plurality of tiles M are generated. The present disclosure can effectively improve processing efficiency of overall image pixel filtering, without generating additional pixel shading workload.

19 Claims, 4 Drawing Sheets

|  |  |  |
|---|---|---|
| $T_{(-1, 1)}$ | $T_{(0, 1)}$ | $T_{(1, 1)}$ |
| $T_{(-1, 0)}$ | $T_{(0, 0)}$ | $T_{(1, 0)}$ |
| $T_{(-1, -1)}$ | $T_{(0, -1)}$ | $T_{(1, -1)}$ |

|  | Top | Bottom | Left | Right |
|---|---|---|---|---|
| Tile M0 |  |  |  |  |
| Tile M1 |  |  |  |  |
| Tile M2 |  |  |  |  |
| Tile M3 |  |  |  |  |
| Tile M4 |  |  |  |  |

METHOD AND SYSTEM FOR PROCESSING GRAPHICS IN TILE-BASED RENDERING MODE

RELATED APPLICATIONS

This application is a bypass continuation of International Application No. PCT/CN2022/137261, filed on Dec. 7, 2022, which claims priority to Chinese Patent Application No. 202211250530.2 filed on Oct. 13, 2022. The disclosures of the prior applications are hereby incorporated by reference in their entirety.

TECHNICAL FIELD

The present disclosure relates to the technical field of image processing, and more particularly, to a method and system for processing graphics in tile-based rendering mode.

BACKGROUND

Computer graphics processing systems are designed to process graphics data (including primitive data and vertex data) from computer graphics applications, such as computer games, and output rendered images generated through a rendering pipeline.

A three-dimensional (3D) model in a graphics application is set up by splitting objects in a scene using primitives (including, but not limited to, triangles, lines, and points, for example) which are defined by vertices for their positions in the 3D space, as well as lighting effects and shading properties. Geometry data of primitives and vertices of the 3D model are sent as an input data stream for the geometry processing phase of the rendering process to a computer graphics processing system, and then the input primitives are subject to geometry processing, which includes transforming the primitives into screen space and removing primitives that are not visible in the screen space. After the geometry processing, the geometry data of primitives and vertices are sent to a fragment processing pipeline to be rendered in the computer graphics processing system. As a result of the rendering processing, an output image from the 3D model is generated by the computer graphics processing system and displayed on a display unit (e.g., a display screen).

The existing computer graphics processing systems include tile-based rendering mode. In tile-based rendering mode, the screen is divided into rectangular tiles, and primitives, after being subject to geometry processing, are sorted into different tiles on the screen, and then fragment processing is performed in each tile on the screen separately to generate rendered images. As the rendered image in the computer graphics processing system in tile-based rendering mode is generated separately in each tile, and filtering for pixels on boundaries of each tile will involve pixels in adjacent tiles, pixel filtering for pixels of the tiles cannot be done during tile processing, and instead has to be performed after all the tiles are rendered, which is inefficient.

SUMMARY

In view of the above defects or need for improvement of the prior art, the present disclosure proposes a method and system for processing graphics in tile-based rendering mode, which can effectively improve processing efficiency of overall image pixel filtering, without generating additional pixel shading workload.

In order to achieve the above objective, according to one aspect of the present disclosure, there is provided a graphics processing system, including: a geometry processing system configured to perform geometry processing on primitives to tile visible primitives into a plurality of tiles M in screen view space; and a fragment processing system configured to render the plurality of tiles M to generate rendered images of the plurality of tiles M, each tile M having a first pixel set Pin, a second pixel set Pb, and a third pixel set Ptile, where Pin=Ptile−Pb, and the third pixel set Ptile contains all pixels of the tile M; where the fragment processing system includes a post-processing module configured to start to perform pixel filtering on pixels in a first pixel set Pin0 of a target tile M0 in the plurality of tiles M at a first time after a rendered image of the target tile M0 is generated and before all the rendered images of the plurality of tiles M are generated.

In some embodiments, the post-processing module is further configured to start to perform pixel filtering on pixels in a second pixel set Pb0 of the target tile M0 at a second time after all the rendered images of the plurality of tiles M are generated.

In some embodiments, the post-processing module is further configured to: start to check rendering statuses of a plurality of adjacent tiles MX of the target tile M0 at a third time after the rendered image of the target tile M0 is generated and before all the rendered images of the plurality of tiles M are generated; and perform pixel filtering on a pixel in a second pixel set Pb0 of the target tile M0 when all pixel information in the plurality of adjacent tiles MX required for pixel filtering on the pixel in the second pixel set Pb0 of the target tile M0 has been generated; or perform pixel filtering on a pixel subset of a second pixel set Pb0 of the target tile M0 when all pixel information in the plurality of adjacent tiles MX required for pixel filtering on the pixel subset of the second pixel set Pb0 of the target tile M0 has been generated.

In some embodiments, the post-processing module is further configured to start to perform pixel filtering on remaining pixels in the second pixel set Pb0 of the target tile M0 at a second time after all the rendered images of the plurality of tiles M are generated, where the remaining pixels are pixels in the second pixel set Pb0 of the target tile M0 that have not been subject to pixel filtering before all the rendered images of the plurality of tiles M are generated.

In some embodiments, the post-processing module is further configured to set a boundary mask and determine, according to the boundary mask, whether the pixel or the pixel subset of the second pixel set Pb0 has been subject to pixel filtering before all the rendered images of the plurality of tiles M are generated.

In some embodiments, each boundary of the tile M is moved inward by k pixel(s), pixels in a resulting first rectangular area constituting the first pixel set Pin; and pixel filtering using a $(2k+1) \times (2k+1)$ filter kernel is performed on the pixels in the first pixel set Pin0 of the target tile M0.

In some embodiments, each tile M further has a fourth pixel set Ps consisting of pixels in a first remaining area in a rectangular area of the tile M with a second rectangular area removed, where the second rectangular area is obtained by moving each boundary of the tile M inward by 2k pixels; the fragment processing system is configured to separately store the fourth pixel set Ps of each tile M; the post-processing module is further configured to obtain pixel color information in a second remaining area from fourth pixel sets PsX of a plurality of adjacent tiles MX of the target tile M0, wherein the second remaining area is an area in a third rectangular area with a rectangular area of the target tile M0 removed, and the third rectangular area is obtained by moving each boundary of the target tile M0 outward by k pixel(s); and the post-processing module is further configured to perform pixel filtering using the (2k+1)×(2k+1) filter kernel on pixels in a second pixel set Pb0 of the target tile M0 according to pixel color information in a fourth pixel set Ps0 of the target tile M0 and pixel color information in the second remaining area.

In some embodiments, a filtered color at pixel (x, y) in the tile M after filtering by the (2k+1)×(2k+1) filter kernel is: $G(x, y) = \sum_{u=-k}^{k} \sum_{v=-k}^{k} (u, v) f(x+u, y+v)$, where k is a positive integer, x and y respectively denote the abscissa and ordinate of the pixel in a pixel coordinate system, u and v respectively denote offsets relative to the abscissa x and ordinate y in the image coordinate system, u and v are both integers, f(x+u, y+v) denotes an original pixel color at pixel (x+u, y+v) in the (2k+1)×(2k+1) filter kernel, and h(u, v) denotes a weight factor of F(x+u, y+v).

In some embodiments, the fragment processing system is configured to calculate, according to a tile index of the target tile M0, tile indexes of the plurality of adjacent tiles MX, and pixel offsets in the target tile M0, pixel color addresses required for pixel filtering using the (2k+1)×(2k+1) filter kernel on the pixels in the second pixel set Pb0.

In some embodiments, the fragment processing system is configured to store pixel information in the fourth pixel set Ps as a whole per tile; and in storage space corresponding to each tile M, the pixel information in the fourth pixel set Ps is stored in an order of top pixels, bottom pixels, left pixels, and right pixels of the tile M.

In some embodiments, the fragment processing system is configured to: store pixel information of a first group of pixels at the top of the tile M in the fourth pixel set Ps column by column; store pixel information of a second group of pixels at the bottom of the tile M in the fourth pixel set Ps column by column; store pixel information of a third group of pixels on the left of the tile M in the fourth pixel set Ps row by row; and store pixel information of a fourth group of pixels on the right of the tile M in the fourth pixel set Ps row by row.

In some embodiments, the column-by-column storage pattern of the fragment processing system includes: storing color information of the pixels in a vertical direction from a start position, and when storage of color information of the pixels in a current column is finished, storage is performed to a next column in a horizontal direction, to store pixels from a start position of the next column.

In some embodiments, the row-by-row storage pattern of the fragment processing system includes: storing color information of the pixels in a horizontal direction from a start position, and when storage of color information of the pixels in a current row is finished, storage is performed to a next row in a vertical direction, to store pixels from a start position of the next row.

In some embodiments, for the (2k+1)×(2k+1) filter kernel, pixel color address of a fourth group of pixels on the right of the tile M0 in the fourth pixel set Ps0 of the target tile M0 is:

$$\text{Addr}(x,y) = \text{Tile}M0 \times u\text{Ps}0 + 2 \times u\text{Phori}0 + u\text{Pvert}0 + y \times 2k + (x - \text{Pr}0 + 2k - 1);$$

where x and y respectively denote the abscissa and ordinate of the pixel in the pixel coordinate system, TileM0 denotes a tile index of the target tile M0, uPs0 denotes the number of pixels in the fourth pixel set Ps0, uPhori0 denotes the number of top pixels or bottom pixels of the target tile M0 in the fourth pixel set Ps0, uPvert0 denotes the number of left pixels or right pixels of the target tile M0 in the fourth pixel set Ps0, and Pr0 denotes a pixel offset of the right boundary of the target tile M0.

In some embodiments, for the (2k+1)×(2k+1) filter kernel, pixel color address of a third group of pixels on the left of the tile M0 in the fourth pixel set Ps0 of the target tile M0 is:

$$\text{Addr}(x,y) = \text{Tile}M0 \times u\text{Ps}0 + 2 \times u\text{Phori}0 + y \times 2k + x.$$

In some embodiments, for the (2k+1)×(2k+1) filter kernel, pixel color address of a first group of pixels at the top of the tile M0 in the fourth pixel set Ps0 of the target tile M0 is:

$$\text{Addr}(x,y) = \text{Tile}M0 \times u\text{Ps}0 + 2k \times x + (\text{Pd}0 - y);$$

where Pd0 denotes a pixel offset of the top boundary of the target tile M0.

In some embodiments, for the (2k+1)×(2k+1) filter kernel, pixel color address of a second group of pixels at the bottom of the tile M0 in the fourth pixel set Ps0 of the target tile M0 is:

$$\text{Addr}(x,y) = \text{Tile}M0 \times u\text{Ps}0 + u\text{Phori}0 + 2k \times x + (2k - 1 - y).$$

In some embodiments, the geometry processing system further includes a geometry processing pipeline configured to delete primitives invisible in the screen view space, with only primitives visible in the screen view space retained; and a tiling module configured to tile the visible primitives into a plurality of tiles M in the screen view space and generate a tiling display list for each tile M; and the fragment processing system is configured to render each tile M according to the tiling display list generated by the tiling module, to obtain a rendered image of each tile M.

In some embodiments, the tiling module tiles the visible primitives into a plurality of tiles M in the screen view space by checking if a primitive overlaps a tile M.

In some embodiments, the tiling display list of each tile M includes all primitives which at least partially overlap the tile M and therefore need to be rendered in the tile M; and when a primitive is located in a plurality of tiles, the primitive is included in tiling display lists of all the tiles, in the screen view space, in which the primitive is located.

In some embodiments, the geometry processing system further includes an input assembler module configured to construct primitives according to input geometry data; and the geometry processing pipeline is configured to process the primitives constructed by the input assembler, to delete primitives invisible in the screen view space.

In some embodiments, the geometry processing pipeline further includes a geometry transformation module, a clipping and culling module, and a data receiving module, where the geometry transformation module is configured to transform the vertex data of the primitives into the screen view space; the clipping and culling module is configured to delete the primitives invisible in the screen view space, with only the primitives visible in the screen view space retained; and the data receiving module is configured to receive and store both primitive data of the primitive visible in the screen view space and the transformed vertex data of the primitive visible in the screen view space.

In some embodiments, the fragment processing system includes a tile processing module, a rasterization module, a hidden surface removal module, and a pixel shading module; where the tile processing module is configured to obtain the tiling display lists generated by the tiling module and send the primitives required for tile rendering in the tiling display lists to the rasterization module; the rasterization module is configured to obtain primitive data and transformed vertex data of the primitives referenced in the tiling display lists and rasterize the primitives into visible pixels; the hidden surface removal module is configured to perform a depth test on the visible pixels output by the rasterization module to remove pixels located behind other primitives at the same pixel positions; and the pixel shading module is configured to shade the visible pixels output by the hidden surface removal module.

According to another aspect of the present disclosure, there is provided a graphics processing method, including: performing geometry processing on primitives to tile visible primitives into a plurality of tiles M in screen view space; rendering the plurality of tiles M to generate rendered images of the plurality of tiles M, each tile M having a first pixel set Pin, a second pixel set Pb, and a third pixel set Ptile, where Pin=Ptile−Pb, and the third pixel set Ptile contains all pixels of the tile M; and starting to perform pixel filtering on pixels in a first pixel set Pin0 of a target tile M0 in the plurality of tiles M at a first time after a rendered image of the target tile M0 is generated and before all the rendered images of the plurality of tiles M are generated.

In some embodiments, the method further includes: starting to perform pixel filtering on pixels in a second pixel set Pb0 of the target tile M0 at a second time after all the rendered images of the plurality of tiles M are generated.

In some embodiments, the method further includes: starting to check rendering statuses of a plurality of adjacent tiles MX of the target tile M0 at a third time after the rendered image of the target tile M0 is generated and before all the rendered images of the plurality of tiles M are generated; and performing pixel filtering on a pixel in a second pixel set Pb0 of the target tile M0 when all pixel information in the plurality of adjacent tiles MX required for pixel filtering on the pixel in the second pixel set Pb0 of the target tile M0 has been generated.

In some embodiments, the method further includes: starting to check rendering statuses of a plurality of adjacent tiles MX of the target tile M0 at a third time after the rendered image of the target tile M0 is generated and before all the rendered images of the plurality of tiles M are generated; and performing pixel filtering on a pixel subset of a second pixel set Pb0 of the target tile M0 when all pixel information in the plurality of adjacent tiles MX required for pixel filtering on the pixel subset of the second pixel set Pb0 of the target tile M0 has been generated.

In some embodiments, the method further includes: starting to perform pixel filtering on remaining pixels in the second pixel set Pb0 of the target tile M0 at a second time after all the rendered images of the plurality of tiles M are generated, where the remaining pixels are pixels in the second pixel set Pb0 of the target tile M0 that have not been subject to pixel filtering before all the rendered images of the plurality of tiles M are generated.

In some embodiments, the method further includes: setting a boundary mask and determining, according to the boundary mask, whether the pixel or the pixel subset of the second pixel set Pb0 has been subject to pixel filtering before all the rendered images of the plurality of tiles M are generated.

In some embodiments, each boundary of the tile M is moved inward by k pixel(s), pixels in a resulting first rectangular area constituting the first pixel set Pin; and pixel filtering using a (2k+1)×(2k+1) filter kernel is performed on the pixels in the first pixel set Pin0 of the target tile M0.

In some embodiments, each tile M further has a fourth pixel set Ps consisting of pixels in a first remaining area in a rectangular area of the tile M with a second rectangular area removed, where the second rectangular area is obtained by moving each boundary of the tile M inward by 2k pixels; and the method further includes: separately storing the fourth pixel set Ps of each tile M; obtaining pixel color information in a second remaining area from fourth pixel sets PsX of a plurality of adjacent tiles MX of the target tile M0, wherein the second remaining area is an area in a third rectangular area with a rectangular area of the target tile M0 removed, and the third rectangular area is obtained by moving each boundary of the target tile M0 outward by k pixels; and performing pixel filtering using the (2k+1)×(2k+1) filter kernel on pixels in a second pixel set Pb0 of the target tile M0 according to pixel color information in a fourth pixel set Ps0 of the target tile M0 and pixel color information in the second remaining area.

In some embodiments, the method further includes: calculating, according to a tile index of the target tile M0, tile indexes of the plurality of adjacent tiles MX, and pixel offsets in the target tile M0, pixel color addresses required for pixel filtering using the (2k+1)×(2k+1) filter kernel on the pixels in the second pixel set Pb0.

In some embodiments, separately storing the fourth pixel set Ps of each tile M includes: storing pixel information in the fourth pixel set Ps as a whole per tile; and in storage space corresponding to each tile M, storing the pixel information in the fourth pixel set Ps in an order of top pixels, bottom pixels, left pixels, and right pixels of the tile M.

In some embodiments, separately storing the fourth pixel set Ps of each tile M further includes: storing pixel information of a first group of pixels at the top of the tile M in the fourth pixel set Ps column by column; storing pixel information of a second group of pixels at the bottom of the tile M in the fourth pixel set Ps column by column; storing pixel information of a third group of pixels on the left of the tile M in the fourth pixel set Ps row by row; and storing pixel information of a fourth group of pixels on the right of the tile M in the fourth pixel set Ps row by row.

In some embodiments, the column-by-column storage pattern of the fragment processing system includes: storing color information of the pixels in a vertical direction from a start position, and when storage of color information of the pixels in a current column is finished, storage is performed to a next column in a horizontal direction, to store pixels from a start position of the next column.

In some embodiments, the row-by-row storage pattern of the fragment processing system includes: storing color information of the pixels in a horizontal direction from a start position, and when storage of color information of the pixels in a current row is finished, storage is performed to a next row in a vertical direction, to store pixels from a start position of the next row.

In some embodiments, for the (2k+1)×(2k+1) filter kernel, pixel color address of a fourth group of pixels on the right of the tile M0 in the fourth pixel set Ps0 of the target tile M0 is:

$$\text{Addr}(x,y) = \text{Tile}M0 \times u\text{Ps}0 + 2 \times u\text{Phori}0 + u\text{Pvert}0 + y \times 2k + (x - \text{Pr}0 + 2k - 1);$$

where x and y respectively denote the abscissa and ordinate of the pixel in the pixel coordinate system, TileM0 denotes a tile index of the target tile M0, uPs0 denotes the number of pixels in the fourth pixel set Ps0, uPhori0 denotes the number of top pixels or bottom pixels of the target tile M0 in the fourth pixel set Ps0, uPvert0 denotes the number of left pixels or right pixels of the target tile M0 in the fourth pixel set Ps0, and Pr0 denotes a pixel offset of the right boundary of the target tile M0.

In some embodiments, for the (2k+1)×(2k+1) filter kernel, pixel color address of a third group of pixels on the left of the tile M0 in the fourth pixel set Ps0 of the target tile M0 is:

Addr(x,y)=TileM0×uPs0+2×uPhori0+y×2k+x.

In some embodiments, for the (2k+1)×(2k+1) filter kernel, pixel color address of a first group of pixels at the top of the tile M0 in the fourth pixel set Ps0 of the target tile M0 is:

Addr(x,y)=TileM0×uPs0+2k×x+(Pd0−y);

where Pd0 denotes a pixel offset of the top boundary of the target tile M0.

In some embodiments, for the (2k+1)×(2k+1) filter kernel, pixel color address of a second group of pixels at the bottom of the tile M0 in the fourth pixel set Ps0 of the target tile M0 is:

Addr(x,y)=TileM0×uPs0+uPhori0+2k×x+(2k−1−y).

According to another aspect of the present disclosure, there is provided an electronic device, including the graphics processing system described above.

According to another aspect of the present disclosure, there is provided an electronic device, including: a processor, and a memory communicatively connected to the processor; where the memory stores instructions executable by the processor and the processor implements the graphics processing method described above by executing the instructions.

According to another aspect of the present disclosure, there is provided a computer-readable storage medium storing computer instructions, where the computer instructions implement the graphics processing method when executed by a processor.

Overall, the above technical solutions conceived in the present disclosure have the following beneficial effects compared to the prior art: as concepts of internal pixel set, boundary pixel set and separately-stored pixel set are introduced into tile processing, the internal pixel set and the boundary pixel set are processed separately. In one aspect, filtering processing of pixels in the internal pixel set of a tile is started after a rendered image of the tile is generated, without waiting for completion of rendering of all the tiles. This effectively improves processing efficiency of overall image pixel filtering, without generating additional pixel shading workload. In another aspect, all pixels required for filtering pixels in the boundary pixel set are stored separately to generate separately-stored pixel sets, which is helpful to quickly obtain pixel color information in the separately-stored pixel sets from a storage space, thereby improving efficiency of filtering on the pixels in the boundary pixel set.

DETAILED DESCRIPTION

In order to make the objectives, technical solutions and advantages of the present disclosure more apparent, the present disclosure is further described in detail in conjunction with the accompanying drawings and embodiments. It should be understood that the specific embodiments described here are intended only to explain the present disclosure and are not intended to limit the present disclosure. As will be appreciated by those skilled in the art, the embodiments described may be modified in various manners without departing from the principle or scope of the present disclosure. Therefore, the accompanying drawings and descriptions are regarded as illustrative in nature rather than restrictive.

In computer graphics, image processing techniques could be applied to rendered images, for example, bloom, depth of field and super resolution upscaling, for the enhancement of a visual effect of the rendering. Pixel colors from surrounding areas of sampled pixels are usually involved in the algorithms for this kind of image processing.

For example, filtered color G(x, y) at pixel (x, y) after filtering by a (2k+1)x(2k+1) filter kernel may be:

$$G(x, y) = \sum_{u=-k}^{k} \sum_{v=-k}^{k} h(u, v) f(x+u, y+v)$$

where k is a positive integer, x and y respectively denote the abscissa and ordinate of the pixel in a pixel coordinate system, u and v respectively denote offsets relative to the abscissa x and ordinate y in the image coordinate system, u and v are both integers, f(x+u, y+v) denotes an original pixel color at pixel (x+u, y+v) in the (2k+1)x(2k+1) filter kernel, and h(u, v) denotes a weight factor of F(x+u, y+v).

Figure 1:
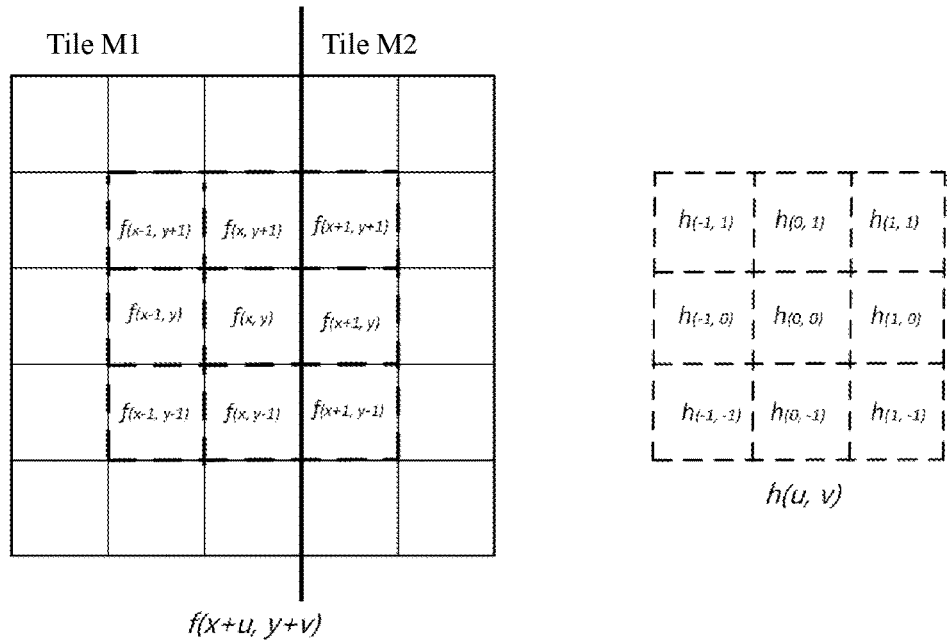
FIG. 1 is a schematic diagram of pixel filtering with a 3×3 pixel filter kernel.

FIG. 1 is a schematic diagram of pixel filtering with a 3×3 pixel filter kernel when k=1. Filtered color at pixel (x, y) after filtering by the 3×3 filter kernel may be $G(x,y)=\Sigma_{u=-1}^{1}\Sigma_{v=-1}^{1}h(u, v) f(x+u,y+v)$. It can be seen that filtering of pixel (x, y) requires information of 8 pixels around it. In other words, when k=1, the filter kernel needs to further process (3×3−1) pixels around the pixel. Similarly, when k=2, the filter kernel needs to further process (5×5−1) pixels around the pixel.

As the rendered image in the computer graphics processing system in tile-based rendering mode is generated separately in each tile and filtering of pixels on the boundaries of each tile will involve pixels in adjacent tiles, filtering of pixels on the boundaries of the tiles cannot be done during processing of the tile. As shown in FIG. 1, the calculation of filtering on original pixel color f(x, y) in tile M1 requires information of original pixel colors f(x+1, y+1), f(x+1, y) and f(x+1, y−1) in adjacent tile M2. As a result, filtering of the boundary pixel (x, y) of tile M1 cannot be completed during processing of tile M1.

In an embodiment of the present disclosure, the tile is divided into an internal pixel set and a boundary pixel set, and filtering is performed on the internal pixel set and the boundary pixel set separately. Here, filtering of the internal pixel set can be started immediately after a rendered image of the tile is generated, so that the filtering workload after completion of rendering of all tiles can be reduced.

Figure 2:
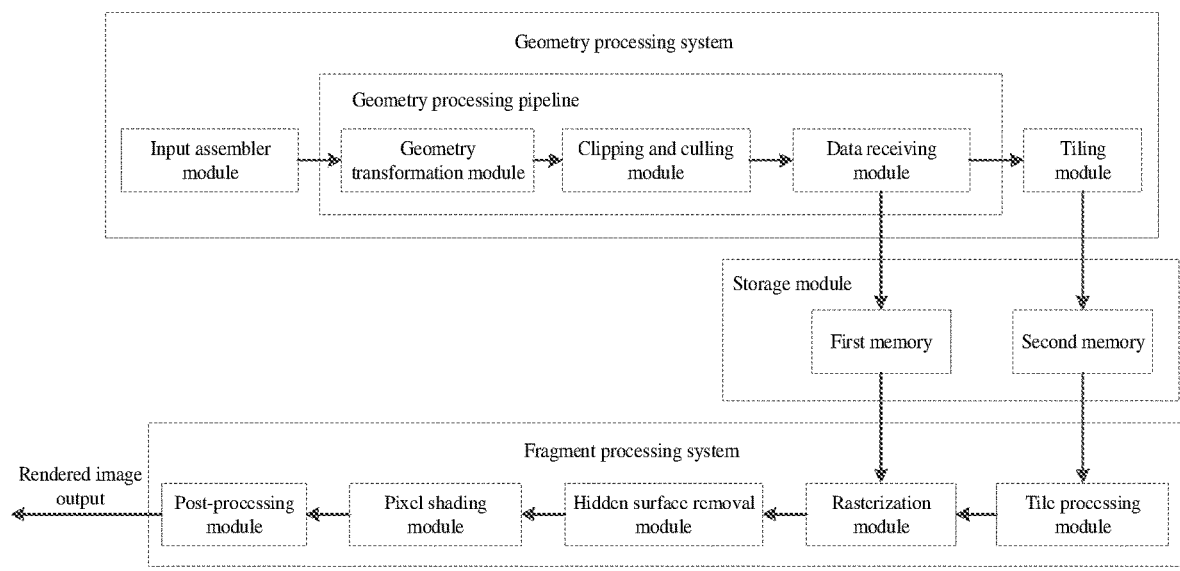
FIG. 2 is a schematic diagram of a system for processing graphics in tile-based rendering mode according to an embodiment of the present disclosure.

As shown in FIG. 2, the system for processing graphics in tile-based rendering mode of an embodiment of the present disclosure includes a geometry processing system and a fragment processing system. The geometry processing system is configured to construct primitives according to input geometry data (such as vertex data), perform geometry processing on the primitives to tile visible primitives into a plurality of tiles M in screen view space, and generate a tiling display list for each tile M.

The geometry processing system further includes an input assembler module, a geometry processing pipeline, and a tiling module. The input assembler module is configured to construct primitives according to input geometry data. The geometry processing pipeline is configured to process the constructed primitives to delete primitives invisible in the screen view space, with only primitives visible in the screen view space retained. The tiling module is configured to tile the visible primitives into a plurality of tiles M in the screen view space and generate a tiling display list for each tile M.

In some embodiments, the tiling display list includes all primitives which at least partially overlap the tile M and therefore need to be rendered in the tile M. When a primitive is located in a plurality of tiles, the primitive is included in tiling display lists of all the tiles, in the screen view space, in which the primitive is located.

Figures 3, 4, 5:
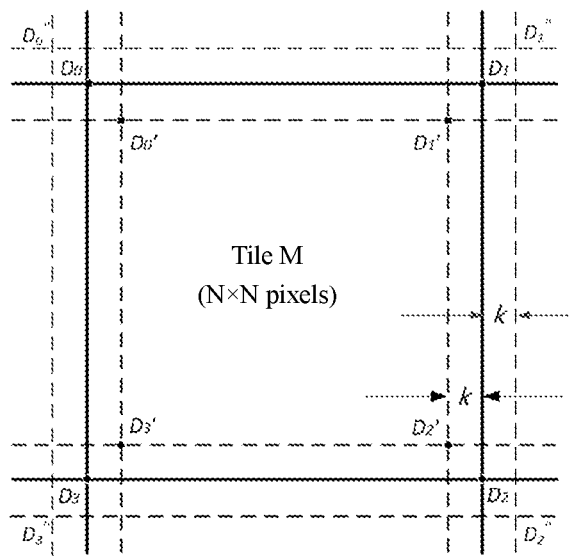
FIG. 3 is a schematic diagram of pixel sets of a tile M according to an embodiment of the present disclosure.
FIG. 4 is a schematic diagram of tile structures according to an embodiment of the present disclosure.
FIG. 5 is a schematic diagram of a separate storage pattern for pixel sets according to an embodiment of the present disclosure.

In some embodiments, the screen view space is divided into a plurality of tiles M, the visible primitives are tiled into the plurality of tiles M, and a tiling display list is generated for each tile M. As shown in FIG. 3, for the tile M of N×N pixel size in the screen view space, by checking whether the primitives are completely or partially located in the rectangular area defined by the corner points $D_0$, $D_1$, $D_2$, and $D_3$, tiling of the primitives can be completed. For example, primitive T0 partially overlaps the rectangular area, and primitive T1 is located within the rectangular area, so that both primitive T0 and primitive T1 are included in the tiling display list of the tile M. Neither of primitive T2 and primitive T3 overlaps the rectangular area, and therefore, neither of primitive T2 and primitive T3 is included in the tiling display list of the tile M.

The geometry processing pipeline further includes a geometry transformation module, a clipping and culling module, and a data receiving module. The geometry transformation module is configured to transform the vertex data of the primitives constructed by the input assembler module into the screen view space. The clipping and culling module is configured to delete the primitives invisible in the screen view space, with only the primitives visible in the screen view space retained, which are primitives required for scene rendering. The data receiving module is configured to receive and store both primitive data of the primitive visible in the screen view space and the transformed vertex data of the primitive visible in the screen view space.

In some embodiments, the geometry processing system includes one geometry processing pipeline, which processes the primitives constructed by and sent from the input assembler module. In some embodiments, the geometry processing system includes a plurality of geometry processing pipelines, and the primitives constructed by the input assembler module are distributed downstream to the plurality of geometry processing pipelines for separate processing.

The primitive data and the transformed vertex data in the data receiving module are written into a first memory in a storage module, and the tiling display list generated by the tiling module is written into a second memory in the storage module.

The fragment processing system is configured to render the plurality of tiles M according to the tiling display lists generated by the geometry processing system, to obtain rendered images of the plurality of tiles M. As shown in FIG. 2, the fragment processing system includes a tile processing module, a rasterization module, a hidden surface removal module, a pixel shading module, and a post-processing module. The tile processing module is configured to read the tiling display lists generated by the geometry processing system from the second memory, and send the primitives required for tile rendering in the tiling display lists to the rasterization module.

The rasterization module is configured to read, from the first memory, primitive data and transformed vertex data of the primitives referenced in the tiling display lists, and rasterize the primitives into visible pixels. In some embodiments, for the tile M, the primitives are rasterized into visible pixels in the tile M.

The hidden surface removal module is configured to perform a depth test on the visible pixels output by the rasterization module. Specifically, depth values of the visible pixels output by the rasterization module are compared with depth values of previous primitive pixels stored in a depth buffer. When a primitive pixel output by the rasterization module is hidden behind a corresponding previous primitive pixel, the primitive pixel output by the rasterization module fails the depth test and is removed. Otherwise, the primitive pixel output by the rasterization module is sent to the pixel shading module. In other words, pixels located behind other primitives at the same pixel positions are removed by the hidden surface removal module. In some embodiments, the depth values of the previous primitive pixels are predefined values. In some embodiments, the depth values of the previous primitive pixels are the depth values of the primitive pixels that passed the depth test before.

To avoid frequent data exchange with an external memory, current depth value of each pixel is stored in an on-chip depth buffer in the computer graphics processing system in tile-based rendering mode. In some embodiments, for the tile M, current depth value of each pixel in the tile M with N×N pixels is stored in the on-chip depth buffer, that is, the on-chip depth buffer for storing the current depth values has a N×N pixel size. It can be understood that the size of the on-chip depth buffer can be set according to actual needs, which is not limited in the present disclosure.

The pixel shading module is configured to shade the visible pixels output by the hidden surface removal module so as to obtain the final color of the primitive pixels. In some embodiments, color information of pixels in the tile M is stored in an on-chip color buffer in the computer graphics processing system in tile-based rendering mode, to avoid frequent data exchange with the external memory and avoid impact on processing efficiency.

In some embodiments, the pixel shading module is configured to shade the pixels in the tile M to obtain a rendered image of the tile M.

In some embodiments, the post-processing module is configured to perform pixel filtering using the filter kernel on the rendered image of the tile M to obtain a filtered image.

In some embodiments, a filtered color at pixel (x, y) in the tile M after filtering by the (2k+1)x(2k+1) filter kernel is: $G(x, y)=\Sigma_{u=-k}^{k}\Sigma_{v=-k}^{k}h(u, v) f(x+u, y+v)$, where k is a positive integer, x and y respectively denote the abscissa and ordinate of the pixel in a pixel coordinate system, u and v respectively denote offsets relative to the abscissa x and ordinate y in the image coordinate system, u and v are both integers, f(x+u, y+v) denotes an original pixel color at pixel (x+u, y+v) in the (2k+1)x(2k+1) filter kernel, and h(u, v) denotes a weight factor of F(x+u, y+v).

As shown in FIG. 3, the tile M with N×N pixels is a rectangular area defined by the corner points $D_0$, $D_1$, $D_2$, and $D_3$. As pixel information from surrounding tiles of the tile M is required for pixel filtering on the tile M, it is impossible to directly process, inside the tile M, pixels located in a boundary area of the tile M.

In some embodiments, the tile M is divided into an internal pixel set Pin (i.e. a first pixel set) and a boundary pixel set Pb (i.e. a second pixel set). The boundary pixel set Pb, a complete pixel set Ptile (i.e. a third pixel set), and the internal pixel set Pin have the following relationships:

PbUPtile

Pb=Ptile−Pin where the complete pixel set Ptile includes all the pixels of the tile M, consisting of N×N pixels in the rectangular area defined by the corner points Do, $D_1$, $D_2$, and $D_3$.

The internal pixel set Pin of the tile M consists of pixels in the rectangular area defined by the corner points $D_0'$, $D_1'$, $D_2'$, and $D_3'$. Pixel filtering can be performed on pixels in the internal pixel set Pin using pixel information in the complete pixel set Ptile of the tile M, without using the pixel information from the surrounding tiles of the tile M.

In some embodiments, by moving each boundary of the tile M inward by k pixel(s), the rectangular area (i.e. a first rectangular area) defined by the corner points $D_0'$, $D_1'$, $D_2'$, and $D_3'$ can be obtained. By using the pixel information in the complete pixel set Ptile of the tile M, pixel filtering using the (2k+1)×(2k+1) filter kernel can be performed on pixels in the internal pixel set Pin.

As all pixels required for pixel filtering using the (2k+1)×(2k+1) filter kernel on the pixels in the internal pixel set Pin are in the tile M, the filtering on the pixels in the internal pixel set Pin can be directly performed after pixel colors in the tile M are generated, without waiting for generation of rendered images of all the tiles.

In some embodiments, for any target tile M0 in the plurality of tiles M, the post-processing module can start to perform pixel filtering on pixels in an internal pixel set Pin0 of the target tile M0 at a first time after a rendered image of the target tile M0 is generated and before all the rendered images of the plurality of tiles M are generated.

In some embodiments, the post-processing module directly writes a result of pixel filtering on the pixels in the internal pixel set Pin0 of the target tile M0 into a memory of a frame color buffer.

As shown in FIG. 3, the boundary pixel set Pb consists of pixels included in the area defined by the corner points $D_0$, $D_1$, $D_2$, and $D_3$ and the area defined by the corner points $D_0'$, $D_1'$, $D_2'$, and $D_3'$. In other words, the boundary pixel set Pb consists of pixels included in a remaining area in the rectangular area of the tile M with the first rectangular area being removed.

In some embodiments, the boundary pixel set Pb includes:
a first group of boundary pixels at the top of the tile M, the first group of boundary pixels being k rows and N columns of pixels;
a second group of boundary pixels at the bottom of the tile M, the second group of boundary pixels being k rows and N columns of pixels;
a third group of boundary pixels on the left of the tile M, the third group of boundary pixels being (N−2k) rows and k columns of pixels; and
a fourth group of boundary pixels on the right of the tile M, the fourth group of boundary pixels being (N−2k) rows and k columns of pixels.

In some embodiments, the boundary pixel set Pb includes:
a first group of boundary pixels at the top of the tile M, the first group of boundary pixels being k rows and (N−2k) columns of pixels;
a second group of boundary pixels at the bottom of the tile M, the second group of boundary pixels being k rows and (N−2k) columns of pixels;
a third group of boundary pixels on the left of the tile M, the third group of boundary pixels being N rows and k columns of pixels; and
a fourth group of boundary pixels on the right of the tile M, the fourth group of boundary pixels being N rows and k columns of pixels.

Therefore, the number of pixels in the boundary pixel set Pb is:

$u$Pb=2k×N+2k×(N−2k)

For a 3×3 kernel when k=1, the number of pixels in the boundary pixel set Pb for the tile M with 32×32 pixels when N=32 is:

$u$Pb=2×32+2×(32−2)=124

Therefore, the number of pixels in the boundary pixel set Pb accounts for 12.1% of the total number of pixels in the tile M with 32×32 pixels.

For a 5×5 kernel when k=2, the number of pixels in the boundary pixel set Pb for the tile M with 32×32 pixels when N=32 is:

$u$Pb=4×32+4×(32−4)=240

Therefore, the number of pixels in the boundary pixel set Pb accounts for 23.44% of the total number of pixels in the tile M with 32×32 pixels.

Since the boundary pixel set Pb of the tile M includes pixels which need pixel information from adjacent tiles of the tile M for pixel filtering, the pixels in the boundary pixel set Pb cannot be directly processed in the tile M.

In some embodiments, the pixel shading module separately stores pixel color information required for pixel filtering on the pixels in the boundary pixel set Pb of the tile M.

As shown in FIG. 3, in an embodiment of the present disclosure, to perform pixel filtering using the (2k+1)×(2k+1) filter kernel on k columns of boundary pixels located on the right of the tile M in the boundary pixel set Pb, it is necessary to separately store k columns of pixels located on the right side of the tile M's right boundary $D_1D_2$ in adjacent tiles and 2k columns of pixels located on the left side of the right boundary $D_1D_2$ in the tile M. To perform pixel filtering using the $(2k+1)\times(2k+1)$ filter kernel on k columns of boundary pixels located on the left of the tile M in the boundary pixel set Pb, it is necessary to separately store k columns of pixels located on the left side of the tile M's left boundary $D_0D_3$ in adjacent tiles and 2k columns of pixels located on the right side of the left boundary $D_0D_3$ in the tile M. To perform pixel filtering using the $(2k+1)\times(2k+1)$ filter kernel on k rows of boundary pixels located at the top of the tile M in the boundary pixel set Pb, it is necessary to separately store k rows of pixels located above the tile M's top boundary $D_0D_1$ in adjacent tiles and 2k rows of pixels located below the top boundary $D_0D_1$ in the tile M. To perform pixel filtering using the $(2k+1)\times(2k+1)$ filter kernel on k rows of boundary pixels located at the bottom of the tile M in the boundary pixel set Pb, it is necessary to separately store k rows of pixels located below the tile M's bottom boundary $D_2D_3$ in adjacent tiles and 2k rows of pixels located above the bottom boundary $D_2D_3$ in the tile M.

In other words, when filter processing using the $(2k+1)\times(2k+1)$ filter kernel is performed on boundary pixel of the tile, color information of k pixels adjacent to the pixel in each direction is required. Therefore, to perform filtering processing on the pixels in the boundary pixel set Pb, the separately-stored pixel color information needs to include color information of k pixels adjacent to each pixel in the boundary pixel set Pb in each direction in addition to the pixels in the boundary pixel set Pb.

Taking FIG. 4 as an example, tile T (0, 0) is surrounded by eight tiles. For a pixel filtering process of boundary pixels on any boundary of tile T (0, 0), boundary pixels in five surrounding tiles are required. For example, boundary pixel information in tile T (−1, 1), tile T (0, 1), tile T (1, 1), tile T (−1, 0), and tile T (1, 0) are required for a pixel filtering process of boundary pixels at the top of tile T (0, 0). For pixel filtering process of boundary pixels on the corner of tile T (0, 0), boundary pixels in three surrounding tiles are required. For example, boundary pixel information in tile T (0, 1), tile T (1, 1) and tile T (1, 0) is required for a pixel filtering process of boundary pixels on the upper right corner of tile T (0, 0).

It can be learned that a first part of pixels required for pixel filtering for pixels in the boundary pixel set of the tile M is included in the tile M, and a second part of pixels required for pixel filtering for pixels in the boundary pixel set of the tile M is included in tiles adjacent to the tile M.

Specifically, as shown in FIG. 3, for pixel filtering using the $(2k+1)\times(2k+1)$ filter kernel for the pixels in the boundary pixel set Pb of the tile M, pixels in an area in a third rectangular area with a second rectangular area removed are required. The third rectangular area is a rectangular area $D_0"D_1"D_2"D_3$ obtained by moving each boundary of the tile M outward by k pixels, and the second rectangular area is obtained by moving each boundary of the tile M inward by 2k pixels.

Therefore, in some embodiments, a separately-stored pixel set Ps (i.e. a fourth pixel set) of each tile M includes 2k rows or 2k columns of pixels inside each boundary of the tile M, i.e. the separately-stored pixel set Ps of the tile M consists of pixels in a first remaining area in the rectangular area of the tile M with the second rectangular area removed. The pixel shading module stores the separately-stored pixel set Ps of each tile M separately. The post-processing module can perform filtering on the pixels in the boundary pixel set of each tile by using pixel color information in the separately-stored pixel sets of the plurality of tiles.

In some embodiments, the post-processing module can perform filtering on pixels in a boundary pixel set Pb0 of the target tile M0 according to pixel color information in a separately-stored pixel set Ps0 of the target tile M0 and separately-stored pixel sets PsX of a plurality of adjacent tiles MX of the target tile M0.

In some embodiments, the post-processing module first obtains pixel color information in a second remaining area from the separately-stored pixel sets PsX of the plurality of adjacent tiles MX of the target tile M0, and performs pixel filtering using the $(2k+1)\times(2k+1)$ filter kernel on pixels in a second pixel set Pb0 of the target tile M0 according to pixel color information in a fourth pixel set Ps0 of the target tile M0 and pixel color information in the second remaining area. Here, the second remaining area is an area in the third rectangular area with the rectangular area of the target tile M0 being removed.

In some embodiments, separate storage is realized by separately reserving a storage space in an original memory and storing information into the separately-reserved storage space. In some embodiments, separate storage is realized by adding a new memory and storing information to the new memory. A pixel post-processing phase of pixel filtering for pixels in the boundary pixel set Pb can only use color information in the separate memory, which is helpful to quickly obtain the pixel color information in the separately-stored pixel set from the storage space, thereby improving efficiency of filtering on the pixels in the boundary pixel set.

In some embodiments, separately-stored pixel set Ps in the tile M with N×N pixels includes:
- a first group of pixels at the top of the tile M, the first group of pixels being 2k rows and N columns of pixels;
- a second group of pixels at the bottom of the tile M, the second group of pixels being 2k rows and N columns of pixels;
- a third group of pixels on the left of the tile M, the third group of pixels being (N−4k) rows and 2k columns of pixels; and
- a fourth group of pixels on the right of the tile M, the fourth group of pixels being (N−4k) rows and 2k columns of pixels.

In other words, the number of pixels in the horizontal direction (top or bottom boundary) of the tile M in the separately-stored pixel set is uPhori=2k×N, and the number of pixels in the vertical (left or right boundary) direction of tile M in the separately-stored pixel set is uPvert=2k×(N−4k).

In some embodiments, separately-stored pixel set Ps in the tile M with N×N pixels includes:
- a first group of pixels at the top of the tile M, the first group of pixels being 2k rows and (N−4k) columns of pixels;
- a second group of pixels at the bottom of the tile M, the second group of pixels being 2k rows and (N−4k) columns of pixels;
- a third group of pixels on the left of the tile M, the third group of pixels being N rows and 2k columns of pixels; and
- a fourth group of pixels on the right of the tile M, the fourth group of pixels being N rows and 2k columns of pixels.

In other words, the number of pixels in the horizontal direction (top or bottom boundary) of the tile M in the separately-stored pixel set is uPhori=2k×(N−4k), and the number of pixels in the vertical (left or right boundary) direction of tile M in the separately-stored pixel set is uPvert=2k×N.

Therefore, the number of pixels of the tile M that need to be stored separately is:

$$uPs=4k\times N+4k\times (N-4k)$$

For a 3×3 kernel when k=1, the number of pixels in the separately-stored pixel set Ps in the tile boundary area for the tile M with 32×32 pixels when N=32 is:

$$uPs=4\times 32+4\times (32-4)=240$$

Therefore, the number of pixels in the separately-stored pixel set Ps accounts for 23.44% of the total number of pixels in the tile M with 32×32 pixels.

For a 5×5 kernel when k=2, the number of pixels in the separately-stored pixel set Ps in the tile boundary area for the tile M with 32×32 pixels when N=32 is:

$$uPs=8\times 32+8\times (32-8)=448$$

Therefore, the number of pixels in the separate-stored pixel set Ps accounts for 43.75% of the total number of pixels in the tile M with 32×32 pixels.

The pixel color information needed by the post-processing module in the pixel filtering process using the (2k+1)×(2k+1) filter kernel for the boundary pixel set can be read from a separate memory or a storage area through address calculation, and the addresses can be calculated according to the tile index and pixel offsets in the tile.

A storage pattern of the separately-stored pixel set Ps in the memory in an embodiment of the present disclosure is shown in FIG. 5. Pixel information from the separately-stored pixel set of each tile M is stored as a whole per tile.

In some embodiments, pixel information from the separately-stored pixel set of each tile is stored as a whole in an order of tiles. For example, in FIG. 5, the pixel information in the separately-stored pixel set of each tile is stored as a whole per tile in an order from M0 to M4. It should be understood that the tiles M0 to M4 in the figure each denote a specific tile M, and different markers are used for ease of distinction and understanding. In storage space corresponding to each tile, the pixel information in the separately-stored pixel set of the tile is stored in an order of top pixels, bottom pixels, left pixels, and right pixels of the tile.

Specifically, when the post-processing module performs pixel filtering using the (2k+1)×(2k+1) filter kernel on the fourth group of boundary pixels, in the boundary pixel set Pb of the tile M, located on the right side of the tile M, it is necessary to read out color information of 2k columns of pixels located on the left side of the tile M's right boundary in the tile M from the separate storage space. Therefore, the color information of 2k columns of pixels located on the left side of the tile M's right boundary in the tile M should be stored at adjacent addresses in the separate storage space, so that it is possible to get all the information required for pixel filtering from the storage space with the least reading operations.

Similarly, color information of 2k columns of pixels located on the right side of the tile M's left boundary in the tile M should also be stored at adjacent addresses in the separate storage space; color information of 2k rows of pixels located below the tile M's top boundary in the tile M should also be stored at adjacent addresses in the separate storage space; and color information of 2k rows of pixels located above the tile M's bottom boundary in the tile M should also be stored at adjacent addresses in the separate storage space.

Figure 6:
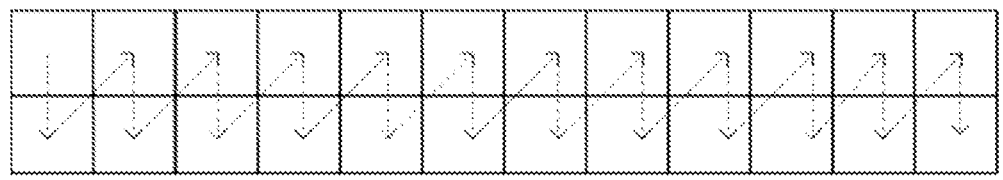
FIG. 6 is a schematic diagram of a pixel storage pattern for the horizontal direction of a tile M in a separately-stored pixel set according to an embodiment of the present disclosure.

In some embodiments, to improve efficiency of memory access, a pixel storage pattern for the horizontal direction (top or bottom boundary) of the tile in the separately-stored pixel set is column-by-column storage. As shown in FIG. 6, color information of the pixels is first stored in a vertical direction from a start position, and when storage of color information of the pixels in a current column is finished, storage is performed to a next column in a horizontal direction, to store pixels from a start position of the next column, and so on.

Figure 7:
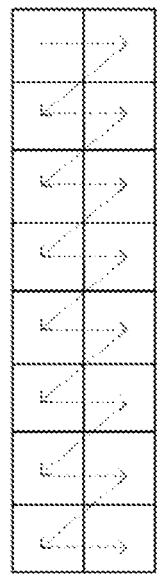
FIG. 7 is a schematic diagram of a pixel storage pattern for the vertical direction of a tile M in a separately-stored pixel set according to an embodiment of the present disclosure.

In some embodiments, to improve efficiency of memory access, a pixel storage pattern for the vertical direction (left or right boundary) of the tile in the separately-stored pixel set is row-by-row storage. As shown in FIG. 7, color information of the pixels is stored in a horizontal direction from a start position, and when storage of color information of the pixels in a current row is finished, storage is performed to a next row in a vertical direction, to store pixels from a start position of the next row, and so on.

In some embodiments, for the (2k+1)×(2k+1) filter kernel, pixel color address of a fourth group of pixels on the right of the tile M0 in the separately-stored pixel set Ps0 of the target tile M0 is:

$$\mathrm{Addr}(x,y)=\mathrm{Tile}M0\times uPs0+2\times uPhori0+uPvert0+y\times 2k+(x-\mathrm{Pr}0+2k-1).$$

In some embodiments, for the (2k+1)×(2k+1) filter kernel, pixel color address of a third group of pixels on the left of the tile M0 in the separately-stored pixel set Ps0 of the target tile M0 is:

$$\mathrm{Addr}(x,y)=\mathrm{Tile}M0\times uPs0+2\times uPhori0+y\times 2k+x.$$

In some embodiments, for the (2k+1)×(2k+1) filter kernel, pixel color address of a first group of pixels at the top of the tile M0 in the separately-stored pixel set Ps0 of the target tile M0 is:

$$\mathrm{Addr}(x,y)=\mathrm{Tile}M0\times uPs0+2k\times x+(\mathrm{Pd}0-y).$$

In some embodiments, for the (2k+1)×(2k+1) filter kernel, pixel color address of a second group of pixels at the bottom of the tile M0 in the separately-stored pixel set Ps0 of the target tile M0 is:

$$\mathrm{Addr}(x,y)=\mathrm{Tile}M0\times uPs0+uPhori0+2k\times x+(2k-1-y).$$

Here, x and y respectively denote the abscissa and ordinate of the pixel in the pixel coordinate system, TileM0 denotes a tile index of the target tile M0, uPs0 denotes the number of pixels in the fourth pixel set Ps0, uPhori0 denotes the number of top pixels or bottom pixels of the target tile M0 in the fourth pixel set Ps0, uPvert0 denotes the number of left pixels or right pixels of the target tile M0 in the fourth pixel set Ps0, Pr0 denotes a pixel offset of the right boundary of the target tile M0, and Pd0 denotes a pixel offset of the top boundary of the target tile M0.

As shown in FIG. 1, a filtered color G(x, y) at boundary pixel (x, y) on the right of the current tile M1 after filtering by the 3×3 filter kernel may be:

$$G(x, y) = \sum_{u=-1}^{1} \sum_{v=-1}^{1} h(u, v)f(x + u, y + v)$$

The pixel color address of a pixel at the column (x−1) and the column x in FIG. 1 can be calculated according to the following formula:

$$\mathrm{Addr}(x,y)=\mathrm{Tile}M1\times uPs1+2\times uPhori1+uPvert1+y\times 2+(x-\mathrm{Pr}1+1)$$

The pixel color address of a pixel at the column (x+1) in the adjacent tile M2 on the right side in FIG. 1 can be calculated according to the following formula:

$$\mathrm{Addr}(x,y)=\mathrm{Tile}M2\times uPs1+2\times uPhori1+y\times 2+x$$

As mentioned above, when k=1, and N=32, the number of pixels in the separately-stored pixel set Ps1 of the tile M1 is uPs1=240. The number of boundary pixels in the horizontal direction (top or bottom boundary) of the tile M1 in the separately-stored pixel set is calculated as uPhori1=64, and the number of boundary pixels in the vertical (left or right boundary) direction of tile M1 in the separately-stored pixel set is calculated as uPvert1=56.

It is known that a tile index of the target tile M1 is TileM1, a tile index of the adjacent tile M2 on the right side is TileM2, and a pixel offset of the right boundary of the target tile M1 is Pr1=31.

The pixel color address of a pixel at the column (x−1) in FIG. 1 can be calculated as:

$$Addr(x-1, y) = TileM1 \times 240 + 2 \times 64 + 56 + y \times 2 + (x-1-31+1) =$$
$$240 \; TileM1 + 184 + 2y + (x-31)$$

The pixel color address of a pixel at the column x in FIG. 1 can be calculated as:

$$Addr(x, y) = TileM1 \times 240 + 2 \times 64 + 56 + y \times 2 + (x-31+1) =$$
$$240 \; TileM1 + 184 + 2y + (x-30)$$

The pixel color address of a pixel at the column (x+1) in FIG. 1 can be calculated as:

$$Addr(x+1, y) =$$
$$TileM2 \times 240 + 2 \times 64 + y \times 2 + x + 1 = 240 \; TileM2 + 129 + 2y + x$$

In some embodiments, the post-processing module starts to perform pixel filtering on the pixels in the boundary pixel set Pb0 of the target tile M0 at a second time after pixel colors in all tiles are generated.

To further improve efficiency of pixel filtering on the boundary pixels of the tile, in an embodiment of the present disclosure, after rendering of the target tile is completed, the post-processing module performs pixel filtering on the pixels in the internal pixel set of the target tile M0 on the one hand, and checks rendering statuses of the adjacent tiles MX of the target tile M0 on the other hand, and in response to the rendering statuses of the adjacent tiles meeting the requirements, performs filtering processing in advance on the pixels in the boundary pixel set of the target tile M0, without waiting for completion of the rendering of all the tiles.

In some embodiments, at a third time after the rendered image of the target tile M0 is generated and before all the rendered images of the plurality of tiles M are generated, the post-processing module starts to check the rendering statuses of the plurality of adjacent tiles MX of the target tile M0. When all pixel information in the plurality of adjacent tiles MX required for pixel filtering on a pixel in the boundary pixel set Pb0 of the target tile M0 has been generated, the post-processing module performs pixel filtering on the pixel in the boundary pixel set Pb0 of the target tile M0. In other words, filtering processing is performed per pixel in the boundary pixel set Pb0.

In some embodiments, at the third time after the rendered image of the target tile M0 is generated and before all the rendered images of the plurality of tiles M are generated, the post-processing module starts to check the rendering statuses of the plurality of adjacent tiles MX of the target tile M0. When all pixel information in the plurality of adjacent tiles MX required for pixel filtering on a pixel subset of the boundary pixel set Pb0 of the target tile M0 has been generated, the post-processing module performs pixel filtering on the pixel subset of the boundary pixel set Pb0 of the target tile M0. In other words, filtering processing is performed per pixel subset consisting of a group of pixels in the boundary pixel set Pb0.

In some embodiments, the pixel subset of the boundary pixel set Pb0 is a first group of boundary pixels located at the top of the target tile M0, a second group of boundary pixels located at the bottom of the target tile M0, a third group of boundary pixels located at the left of the target tile M0, or a fourth group of boundary pixels located at the right of the target tile M0.

It should be understood that the third time and the first time may be the same time or different times, both of which fall within the protection scope of the present disclosure. This is not limited in the present disclosure.

In some embodiments, the post-processing module starts to perform pixel filtering on remaining pixels in the boundary pixel set Pb0 of the target tile M0 at the second time after all the rendered images of the plurality of tiles M are generated. Here, the remaining pixels are pixels in the boundary pixel set Pb0 of the target tile M0 that have not been subject to pixel filtering before all the rendered images of the plurality of tiles M are generated.

It can be learned that through the above-described processing, the pixel filtering can be performed on the boundary pixels of the target tile during rendering of the tiles (i.e. at a time when the rendering of all the tiles is not completed), without waiting for completion of the rendering of all the tiles, thereby further reducing workload of a subsequent separate processing phase.

It should be understood that, all four groups of boundary pixels may be processed during rendering of the tiles for some target tiles, or some of the four groups of boundary pixels may be processed during rendering of the tiles for some other target tiles, or none of the four groups of boundary pixels meet the processing condition for some target tiles, in which case no boundary pixels can be processed during rendering of the tiles.

Further, in some embodiments, the post-processing module stores a boundary mask for each tile to indicate whether a pixel or a pixel subset of the tile boundary pixel set has been subject to pixel filtering before all the rendered images of the plurality of tiles M are generated. In some embodiments, a 4-bit boundary mask is stored for each tile, to respectively indicate whether the first group of boundary pixels located at the top of the tile, the second group of boundary pixels located at the bottom of the tile, the third group of boundary pixels located on the left of the tile, and the fourth group of boundary pixels located on the right of the tile in the tile boundary pixel set have been subject to pixel filtering before rendering of all the tiles is completed. In some embodiments, after the pixel filtering is performed on a pixel subset of the boundary pixel set, a corresponding boundary bit is set in the boundary mask, so that the boundary can be skipped in the separate phase of the subsequent filtering processing for boundary pixels, thereby reducing workload of the separate processing phase.

As shown in FIG. 4, in the pixel filtering process in an inner area (i.e. the internal pixel set Pin) of tile T (0, 0), if rendering in adjacent tile T (−1, 1), tile T (0, 1), tile T (1, 1), tile T (−1, 0) and tile T (1, 0) has been completed and their boundary pixel information has been stored into the separate memory and is available, filtering processing may be started for a first group of boundary pixels at the top of tile T (0, 0). A bit of a boundary mask corresponding to the top boundary pixels in the tile T (0, 0) can be set to 1 after the filtering processing, to avoid filtering being performed again on the first group of boundary pixels at the top of the tile T (0, 0) in the subsequent separate processing phase after all the tiles are rendered. This can effectively improve efficiency of filtering processing on the pixels in the boundary pixel set.

Figure 8:
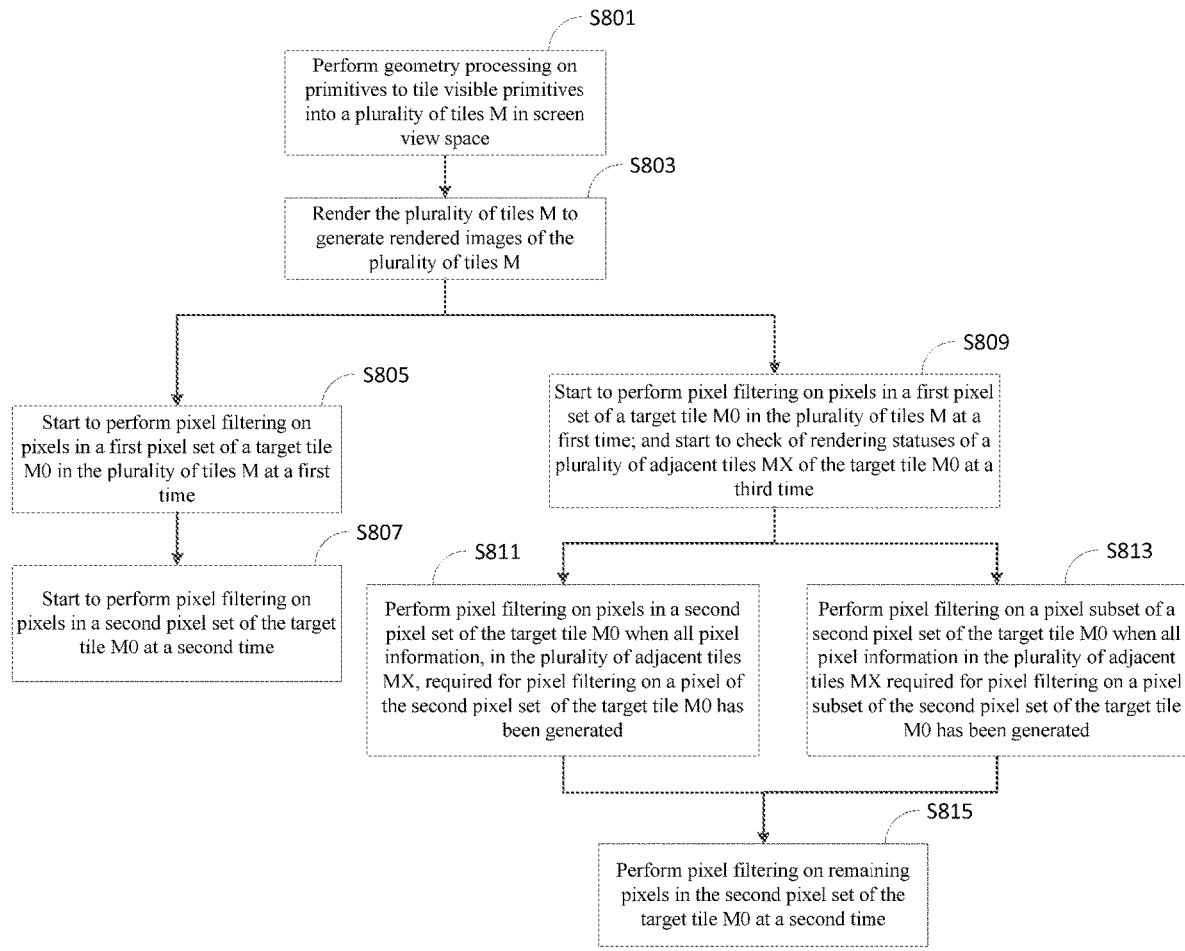
FIG. 8 is a flowchart of a method for processing graphics in tile-based rendering mode according to an embodiment of the present disclosure.

As shown in FIG. 8, the method for processing graphics in tile-based rendering mode of an embodiment of the present disclosure includes the following steps.

At step S801, geometry processing is performed on primitives to tile visible primitives into a plurality of tiles M in screen view space.

At step S803, the plurality of tiles M are rendered to generate rendered images of the plurality of tiles M.

Here, each tile M has a first pixel set Pin, a second pixel set Pb, and a third pixel set Ptile, where Pin=Ptile−Pb, and the third pixel set Ptile contains all pixels of the tile M.

At step S805, pixel filtering is started on pixels in a first pixel set Pin0 of a target tile M0 in the plurality of tiles M at a first time after a rendered image of the target tile M0 is generated and before all the rendered images of the plurality of tiles M are generated.

At step S807, pixel filtering is started on pixels in a second pixel set Pb0 of the target tile M0 at a second time after all the rendered images of the plurality of tiles M are generated.

At step S809, pixel filtering is started on pixels in a first pixel set Pin0 of a target tile M0 in the plurality of tiles M at a first time after a rendered image of the target tile M0 is generated and before all the rendered images of the plurality of tiles M are generated; and check of rendering statuses of a plurality of adjacent tiles MX of the target tile M0 is started at a third time after the rendered image of the target tile M0 is generated and before all the rendered images of the plurality of tiles M are generated.

In some embodiments, the third time and the first time are the same. In some embodiments, the third time and the first time are different.

At step S811, pixel filtering is performed on pixels in a second pixel set Pb0 of the target tile M0 when all pixel information, in the plurality of adjacent tiles MX, required for pixel filtering on a pixel of the second pixel set Pb0 of the target tile M0 has been generated.

At step S813, pixel filtering is performed on a pixel subset of a second pixel set Pb0 of the target tile M0 when all pixel information, in the plurality of adjacent tiles MX, required for pixel filtering on a pixel subset of the second pixel set Pb0 of the target tile M0 has been generated.

At step S815, pixel filtering is performed on remaining pixels in the second pixel set Pb0 of the target tile M0 at a second time after all the rendered images of the plurality of tiles M are generated.

Here, the remaining pixels are pixels in the second pixel set Pb0 of the target tile M0 that have not been subject to pixel filtering before all the rendered images of the plurality of tiles M are generated.

In some embodiments, a boundary mask is set and it is determined, according to the boundary mask, whether a pixel or a pixel subset of the second pixel set Pb0 has been subject to pixel filtering before all the rendered images of the plurality of tiles M are generated.

In some embodiments, each boundary of the tile M is moved inward by k pixels, pixels in a resulting first rectangular area constituting the first pixel set Pin; and pixel filtering using a (2k+1)×(2k+1) filter kernel is performed on the pixels in the first pixel set Pin0 of the target tile M0.

In some embodiments, each tile M also has a fourth pixel set Ps, where the fourth pixel set Ps consists of pixels in a first remaining area in a rectangular area of the tile M with a second rectangular area removed, and the second rectangular area is obtained by moving each boundary of the tile M inward by 2k pixels. The method for processing graphics in tile-based rendering mode of an embodiment of the present disclosure further includes:

separately storing the fourth pixel set Ps of each tile M;

obtaining pixel color information in a second remaining area from a fourth pixel set PsX of a plurality of adjacent tiles MX of the target tile M0, where the second remaining area is an area in a third rectangular area with a rectangular area of the target tile M0 removed, and the third rectangular area is obtained by moving each boundary of the target tile M0 outward by k pixels; and performing pixel filtering using the (2k+1)×(2k+1) filter kernel on pixels in a second pixel set Pb0 of the target tile M0 according to pixel color information in a fourth pixel set Ps0 of the target tile M0 and pixel color information in the second remaining area.

In some embodiments, pixel color addresses required for pixel filtering using the (2k+1)×(2k+1) filter kernel on the pixels in the second pixel set Pb0 are calculated according to a tile index of the target tile M0, tile indexes of the plurality of adjacent tiles MX and pixel offsets in the target tile M0.

In some embodiments, separately storing the fourth pixel set Ps of each tile M includes:

storing pixel information in the fourth pixel set Ps as a whole per tile; and in storage space corresponding to each tile M, storing the pixel information in the fourth pixel set Ps in an order of top pixels, bottom pixels, left pixels, and right pixels of the tile M.

In some embodiments, separately storing the fourth pixel set Ps of each tile M further includes:

storing pixel information of a first group of pixels at the top of the tile M in the fourth pixel set Ps column by column;

storing pixel information of a second group of pixels at the bottom of the tile M in the fourth pixel set Ps column by column;

storing pixel information of a third group of pixels on the left of the tile M in the fourth pixel set Ps row by row; and storing pixel information of a fourth group of pixels on the right of the tile M in the fourth pixel set Ps row by row.

For further implementation of the method for processing graphics in tile-based rendering mode of an embodiment of the present disclosure, reference may be made to the descriptions of the system for processing graphics in tile-based rendering mode. Repeated details are not to be described herein in the present disclosure.

Figure 9:
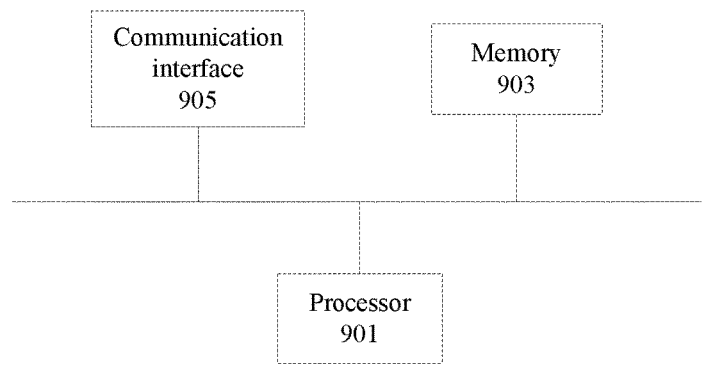
FIG. 9 is a block diagram of an electronic device according to an embodiment of the present disclosure.

FIG. 9 is a block diagram of an electronic device according to an embodiment of the present disclosure. A further embodiment of the present disclosure provides an electronic device, as shown in FIG. 9, including: at least one processor 901 and a memory 903 communicatively connected to the at least one processor 901. The memory 903 stores instructions executable by the at least one processor 901. The instructions are executed by the at least one processor 901. The processor 901, when executing the instructions, implements the graphics processing method in the above embodiments. The number of the memory/memories 903 and processor(s) 901 may be one or more. The electronic device is intended to represent various types of digital computers, such as a laptop computer, a desktop computer, a workstation, a personal digital assistant, a server, a blade server, a mainframe computer, and other suitable computers. The electronic device may also represent various types of mobile devices, such as a personal digital assistant, a cellular phone, a smart phone, a wearable device, and other similar computing devices. The components shown herein, their connections and relationships, and their functions are intended as examples only and are not intended to limit the implementation of the present disclosure described and/or claimed herein.

The electronic device may also include a communication interface 905 for communicating with external devices for interactive data transmission. The various devices are connected to each other using different buses and may be mounted on a common motherboard or otherwise mounted as required. The processor 901 may process instructions executed within the electronic device, including instructions stored in or on the memory to display graphical information for a graphical user interface (GUI) on an external input/output device, such as a display device coupled to an interface. In other embodiments, if desired, multiple processors and/or multiple buses may be used with multiple memories. Likewise, multiple electronic devices may be connected, each providing part of the necessary operations (e.g., as a server array, a blade server, or a multiprocessor system). The buses may involve an address bus, a data bus, a control bus, etc. For ease of presentation, only one thick line is used for representation in FIG. 9. However, it is not implied that there is only one bus or one type of bus.

Alternatively, in specific embodiments, if the memory 903, the processor 901, and the communication interface 905 are integrated on one single chip, the memory 903, the processor 901, and the communication interface 905 may communicate with each other through internal interfaces.

It should be understood that the processor may be a central processing unit (CPU), or other general-purpose processors, a digital signal processor (DSP), an application-specific integrated circuit (ASIC), a field-programmable gate array (FPGA), or other programmable logic devices, discrete gates or transistor logic devices, discrete hardware components, etc. The general-purpose processor may be a microprocessor or any conventional processor. It is worth noting that the processor may be a processor that supports the Advanced RISC Machines (ARM) architecture.

An embodiment of the present disclosure provides a computer-readable storage medium (such as the memory 903 described above) storing computer instructions which, when executed by a processor, causes the processor to implement the method according to any of the embodiments of the present disclosure.

Alternatively, the memory 903 may include a storage program area and a storage data area, where the storage program area may store an operating system and application program(s) required by at least one function, and the storage data area may store data created according to the use of the electronic device for the graphics processing method, etc. In addition, the memory 903 may include a high-speed random-access memory and a non-transitory memory, for example, at least one magnetic disk storage device, a flash memory device, or another non-transitory solid-state storage device. In some embodiments, the memory 903 optionally includes memories remotely located with respect to the processor 901, and these remote memories may be connected to the electronic device for the graphics processing method via a network. Examples of the above-mentioned network include the Internet, an intranet, a local area network, a mobile communication network, and a combination thereof.

In description of the present disclosure, references to "one embodiment," "some embodiments," "an example," "a specific example," "some examples," etc., indicate that a particular feature, structure, material, or characteristic described in the embodiment or example can be included in at least one embodiment or example of the disclosure. Moreover, the particular feature, structure, material, or characteristic described can be combined in any one or more embodiments or examples in a reasonable way. Besides, it would be within the knowledge of a person skilled in the pertinent art to affect such feature, structure, material, or characteristic in connection with other embodiments or examples without contradiction.

Moreover, terms such as "first" and "second" are just for illustration which should not be interpreted as indicating or implying relative importance, or implying number of the indicated feature. Thus, a feature described by "first" or "second" can include at least one of the feature explicitly or implicitly. In description of the present disclosure, "multiple" means two or more, unless otherwise specified.

Any process or method described in a flowchart or otherwise herein can be interpreted as including one or more (two or more than two) modules, fragments or sections of executable code to implement steps of a specified logical function or process. Also, the scope of preferred embodiments of the disclosure includes alternative embodiments where the function can be performed out of the order shown or discussed, including performing the function in a substantially simultaneous way or in a reverse order.

The logic and/or steps described in a flowchart or otherwise herein, for example, can be a list of executable code to implement a logic function, which can be embodied in any computer-readable medium and can be used by or in combination with an instruction execution system, apparatus or device (e.g., a computer-based system, a system including a processor, or other systems capable of reading and executing instructions from an instruction execution system, apparatus or device).

It should be understood that various parts of the present disclosure can be implemented by hardware, software, firmware, or a combination thereof. In the foregoing embodiments, various steps or methods can be implemented by software or firmware stored in a memory and executed by a suitable instruction execution system. All or part of the steps of the methods in the foregoing embodiments can be implemented by controlling relevant hardware through a program, which can be stored in a computer-readable storage medium and can implement one or a combination of the steps of the method of the embodiment when executed.

In addition, all the function unit in each embodiment of the disclosure can either be integrated in one processing module, or be separate units, or two or more of the function units are integrated in one module. The integrated module can be implemented by hardware or by function modules of software. Being implemented in the form of software function modules and being sold or used as a separate product, the integrated module mentioned above can also be stored in a computer-readable storage medium, which could be a read-only memory, a magnetic disk, an optical disk, and the like.

Only some specific embodiments of the present disclosure are described above, and the scope of protection of the present disclosure is not limited thereto. Any changes or substitutions that can be readily conceived by those skilled in the art within the technical scope disclosed by the present disclosure shall fall within the scope of protection of the present disclosure. Therefore, the scope of protection of the present disclosure should be subject to the scope of protection of the claims.

The invention claimed is:

1. A graphics processing system, comprising:
a geometry processing system configured to perform geometry processing on primitives to tile visible primitives into a plurality of tiles M in screen view space; and
a fragment processing system configured to render the plurality of tiles M to generate rendered images of the plurality of tiles M, each tile M having a first pixel set Pin, a second pixel set Pb, and a third pixel set Ptile, wherein Pin=Ptile−Pb, and the third pixel set Ptile contains all pixels of the tile M; wherein
the fragment processing system comprises a post-processing module configured to start to perform pixel filtering on pixels in a first pixel set Pin0 of a target tile M0 in the plurality of tiles M at a first time after a rendered image of the target tile M0 is generated and before all the rendered images of the plurality of tiles M are generated,
wherein each boundary of the tile M is moved inward by k pixel(s), pixels in a resulting first rectangular area consulting the first pixel set Pin; and pixel filtering using a (2k+1)×(2k+1) filter kernel is performed on the pixels in the first pixel set Pin0 of the target tile M0.

2. The graphics processing system of claim 1, wherein the post-processing module is further configured to start to perform pixel filtering on pixels in a second pixel set Pb0 of the target tile M0 at a second time after all the rendered images of the plurality of tiles M are generated.

3. The graphics processing system of claim 1, wherein the post-processing module is further configured to: start to check rendering statuses of a plurality of adjacent tiles MX of the target tile M0 at a third time after the rendered image of the target tile M0 is generated and before all the rendered images of the plurality of tiles M are generated; and perform pixel filtering on a pixel in a second pixel set Pb0 of the target tile M0 when all pixel information in the plurality of adjacent tiles MX required for pixel filtering on the pixel in the second pixel set Pb0 of the target tile M0 has been generated; or perform pixel filtering on a pixel subset of a second pixel set Pb0 of the target tile M0 when all pixel information in the plurality of adjacent tiles MX required for pixel filtering on the pixel subset of the second pixel set Pb0 of the target tile M0 has been generated.

4. The graphics processing system of claim 3, wherein the post-processing module is further configured to start to perform pixel filtering on remaining pixels in the second pixel set Pb0 of the target tile M0 at a second time after all the rendered images of the plurality of tiles M are generated, wherein the remaining pixels are pixels in the second pixel set Pb0 of the target tile M0 that have not been subject to pixel filtering before all the rendered images of the plurality of tiles M are generated.

5. The graphics processing system of claim 3, wherein the post-processing module is further configured to set a boundary mask and determine, according to the boundary mask, whether the pixel or the pixel subset of the second pixel set Pb0 has been subject to pixel filtering before all the rendered images of the plurality of tiles M are generated.

6. The graphics processing system of claim 1, wherein each tile M further has a fourth pixel set Ps consisting of pixels in a first remaining area in a rectangular area of the tile M with a second rectangular area removed, wherein the second rectangular area is obtained by moving each boundary of the tile M inward by 2k pixels; the fragment processing system is configured to separately store the fourth pixel set Ps of each tile M;
the post-processing module is further configured to obtain pixel color information in a second remaining area from fourth pixel sets PsX of a plurality of adjacent tiles MX of the target tile M0, wherein the second remaining area is an area in a third rectangular area with a rectangular area of the target tile M0 removed, and the third rectangular area is obtained by moving each boundary of the target tile M0 outward by k pixel(s); and
the post-processing module is further configured to perform pixel filtering using the (2k+1)×(2k+1) filter kernel on pixels in a second pixel set Pb0 of the target tile M0 according to pixel color information in a fourth pixel set Ps0 of the target tile M0 and pixel color information in the second remaining area.

7. The graphics processing system of claim 6, wherein a filtered color at pixel (x, y) in the tile M after filtering by the (2k+1)×(2k+1) filter kernel is: $G(x,y)=\Sigma_{u=-k}^{k}\Sigma_{v=-k}^{k}h(u,v)f(x+u,y+v)$, wherein k is a positive integer, x and y respectively denote the abscissa and ordinate of the pixel in a pixel coordinate system, u and v respectively denote offsets relative to the abscissa x and ordinate y in the image coordinate system, u and v are both integers, $f(x+u, y+v)$ denotes an original pixel color at pixel (x+u, y+v) in the (2k+1)×(2k+1) filter kernel, and $h(u, v)$ denotes a weight factor of $F(x+u, y+v)$.

8. The graphics processing system of claim 6, wherein the fragment processing system is configured to calculate, according to a tile index of the target tile M0, tile indexes of the plurality of adjacent tiles MX, and pixel offsets in the target tile M0, pixel color addresses required for pixel filtering using the (2k+1)×(2k+1) filter kernel on the pixels in the second pixel set Pb0.

9. The graphics processing system of claim 6, wherein the fragment processing system is configured to store pixel information in the fourth pixel set Ps as a whole per tile; and in storage space corresponding to each tile M, the pixel information in the fourth pixel set Ps is stored in an order of top pixels, bottom pixels, left pixels, and right pixels of the tile M.

10. A graphics processing method, comprising:
performing geometry processing on primitives to tile visible primitives into a plurality of tiles M in screen view space;
rendering the plurality of tiles M to generate rendered images of the plurality of tiles M, each tile M having a first pixel set Pin, a second pixel set Pb, and a third pixel set Ptile, wherein Pin=Ptile−Pb, and the third pixel set Ptile contains all pixels of the tile M;
starting to perform pixel filtering on pixels in a first pixel set Pin0 of a target tile M0 in the plurality of tiles M at a first time after a rendered image of the target tile M0 is generated and before all the rendered images of the plurality of tiles M are generated,
wherein each boundary of the tile M is moved inward by k pixel(s), pixels in a resulting first rectangular area consulting the first pixel set Pin; and pixel filtering using a (2k+1)×(2k+1) filter kernel is performed on the pixels in the first pixel set Pin0 of the target tile M0.

11. The graphics processing method of claim 10, further comprising: starting to perform pixel filtering on pixels in a second pixel set Pb0 of the target tile M0 at a second time after all the rendered images of the plurality of tiles M are generated.

12. The graphics processing method of claim 10, further comprising:
   starting to check rendering statuses of a plurality of adjacent tiles MX of the target tile M0 at a third time after the rendered image of the target tile M0 is generated and before all the rendered images of the plurality of tiles M are generated; and
   performing pixel filtering on a pixel in a second pixel set Pb0 of the target tile M0 when all pixel information in the plurality of adjacent tiles MX required for pixel filtering on the pixel in the second pixel set Pb0 of the target tile M0 has been generated; or
   performing pixel filtering on a pixel subset of a second pixel set Pb0 of the target tile M0 when all pixel information in the plurality of adjacent tiles MX required for pixel filtering on the pixel subset of the second pixel set Pb0 of the target tile M0 has been generated.

13. The graphics processing method of claim 12, further comprising: starting to perform pixel filtering on remaining pixels in the second pixel set Pb0 of the target tile M0 at a second time after all the rendered images of the plurality of tiles M are generated, wherein the remaining pixels are pixels in the second pixel set Pb0 of the target tile M0 that have not been subject to pixel filtering before all the rendered images of the plurality of tiles M are generated.

14. The graphics processing method of claim 12, further comprising: setting a boundary mask and determining, according to the boundary mask, whether the pixel or the pixel subset of the second pixel set Pb0 has been subject to pixel filtering before all the rendered images of the plurality of tiles M are generated.

15. The graphics processing method of claim 10, wherein each tile M further has a fourth pixel set Ps consisting of pixels in a first remaining area in a rectangular area of the tile M with a second rectangular area removed, wherein the second rectangular area is obtained by moving each boundary of the tile M inward by 2k pixels; and the method further comprises:
   separately storing the fourth pixel set Ps of each tile M;
   obtaining pixel color information in a second remaining area from fourth pixel sets PsX of a plurality of adjacent tiles MX of the target tile M0, wherein the second remaining area is an area in a third rectangular area with a rectangular area of the target tile M0 removed, and the third rectangular area is obtained by moving each boundary of the target tile M0 outward by k pixel(s); and
   performing pixel filtering using the (2k+1)×(2k+1) filter kernel on pixels in a second pixel set Pb0 of the target tile M0 according to pixel color information in a fourth pixel set Ps0 of the target tile M0 and pixel color information in the second remaining area.

16. The graphics processing method of claim 15, further comprising: calculating, according to a tile index of the target tile M0, tile indexes of the plurality of adjacent tiles MX and pixel offsets in the target tile M0, pixel color addresses required for pixel filtering using the (2k+1)×(2k+1) filter kernel on the pixels in the second pixel set Pb0.

17. The graphics processing method of claim 15, wherein the separately storing the fourth pixel set Ps of each tile M comprises:
   storing pixel information in the fourth pixel set Ps as a whole per tile; and
   in storage space corresponding to each tile M, the pixel information in the fourth pixel set Ps is stored in an order of top pixels, bottom pixels, left pixels, and right pixels of the tile M.

18. The graphics processing method of claim 17, wherein the separately storing the fourth pixel set Ps of each tile M further comprises:
   storing pixel information of a first group of pixels at the top of the tile M in the fourth pixel set Ps column by column;
   storing pixel information of a second group of pixels at the bottom of the tile M in the fourth pixel set Ps column by column;
   storing pixel information of a third group of pixels on the left of the tile M in the fourth pixel set Ps row by row; and
   storing pixel information of a fourth group of pixels on the right of the tile M in the fourth pixel set Ps row by row.

19. A graphics processing system, comprising:
   a geometry processing system configured to perform geometry processing on primitives to tile visible primitives into a plurality of tiles M in screen view space; and
   a fragment processing system configured to render the plurality of tiles M to generate rendered images of the plurality of tiles M, each tile M having a first pixel set Pin, a second pixel set Pb, and a third pixel set Ptile, wherein Pin =Ptile-Pb, and the third pixel set Ptile contains all pixels of the tile M; wherein the fragment processing system comprises a post-processing module configured to start to perform pixel filtering on pixels in a first pixel set Pin0 of a target tile M0 in the plurality of tiles M at a first time after a rendered image of the target tile M0 is generated and before all the rendered images of the plurality of tiles M are generated, wherein the post-processing module is further configured to start to perform pixel filtering on pixels in a second pixel set Pb0 of the target tile M0 at a second time after all the rendered images of the plurality of tiles M are generated.

* * * * *